United States Patent
Cates

[19]

[11] Patent Number: 6,116,564
[45] Date of Patent: *Sep. 12, 2000

[54] HANGING STRAP TO ASSIST IN INSTALLATION OF A FIXTURE AND A METHOD FOR ASSISTING INSTALLATION

[75] Inventor: Ron Cates, Georgetown, Ind.

[73] Assignee: Thomas Industries, Inc., Louisville, Ky.

[*] Notice: Under 35 U.S.C. 154(b), the term of this patent shall be extended for 367 days.

[21] Appl. No.: 08/602,125

[22] Filed: Feb. 15, 1996

[51] Int. Cl.[7] .................................................. F16M 13/00
[52] U.S. Cl. .......................... 248/544; 248/300; 362/414
[58] Field of Search .................................. 248/544, 690, 248/692, 300, 301, 304, 213.2, 205.1, 215; 362/414

[56] References Cited

U.S. PATENT DOCUMENTS

| | | | |
|---|---|---|---|
| 2,687,867 | 8/1954 | Wolar | 248/339 |
| 2,971,737 | 11/1961 | Parker | 248/205.1 |
| 3,082,987 | 3/1963 | Robinson | 248/300 |
| 3,433,449 | 3/1969 | Musante | 248/304 |
| 3,754,724 | 8/1973 | Osowski | 248/690 |
| 4,414,616 | 11/1983 | De Vos et al. | 362/396 |
| 4,709,890 | 12/1987 | Moore | 248/301 |
| 5,323,995 | 6/1994 | Grittman et al. | 248/300 |
| 5,442,132 | 8/1995 | Sandell et al. | 248/544 |

*Primary Examiner*—Ramon O. Ramirez
*Assistant Examiner*—Kimberly T. Wood
*Attorney, Agent, or Firm*—Hill & Simpson

[57] ABSTRACT

A mounting strap is provided to assist in holding a lighting fixture near an attachment point. The mounting strap has a first end having a portion that is bent at a point along its length to form an acute angle with respect to the length of the remainder of the mounting strap. An aperture is provided in the length of the member to attach the mounting strap to the lighting fixture. The bent portion may be suspended over the mount to which the lighting fixture is to be attached. Following the necessary installation steps, such as connection of electrical wire, the mounting strap may be placed on the mount on which the lighting fixture is attached.

20 Claims, 4 Drawing Sheets

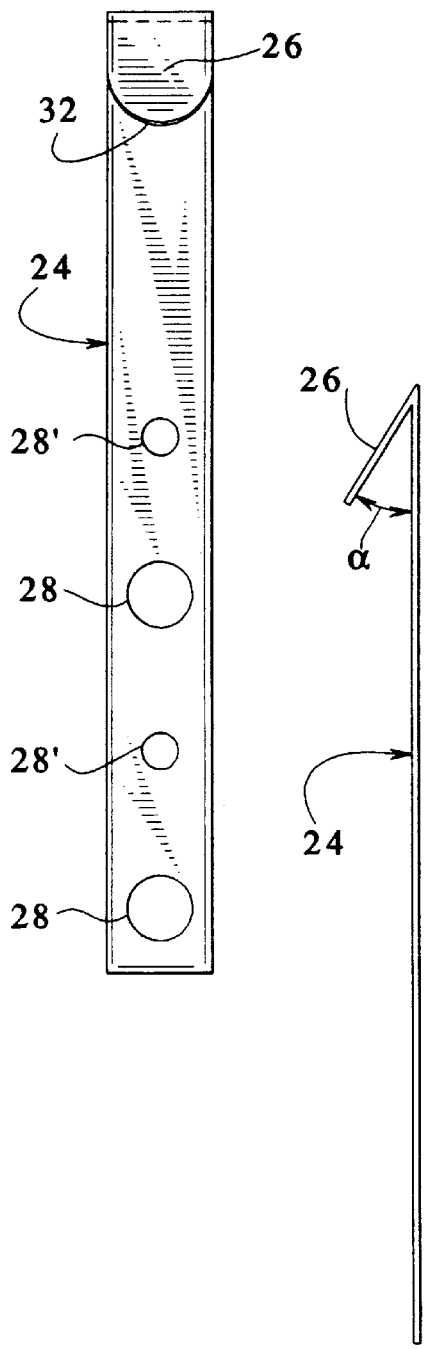
FIG. 3
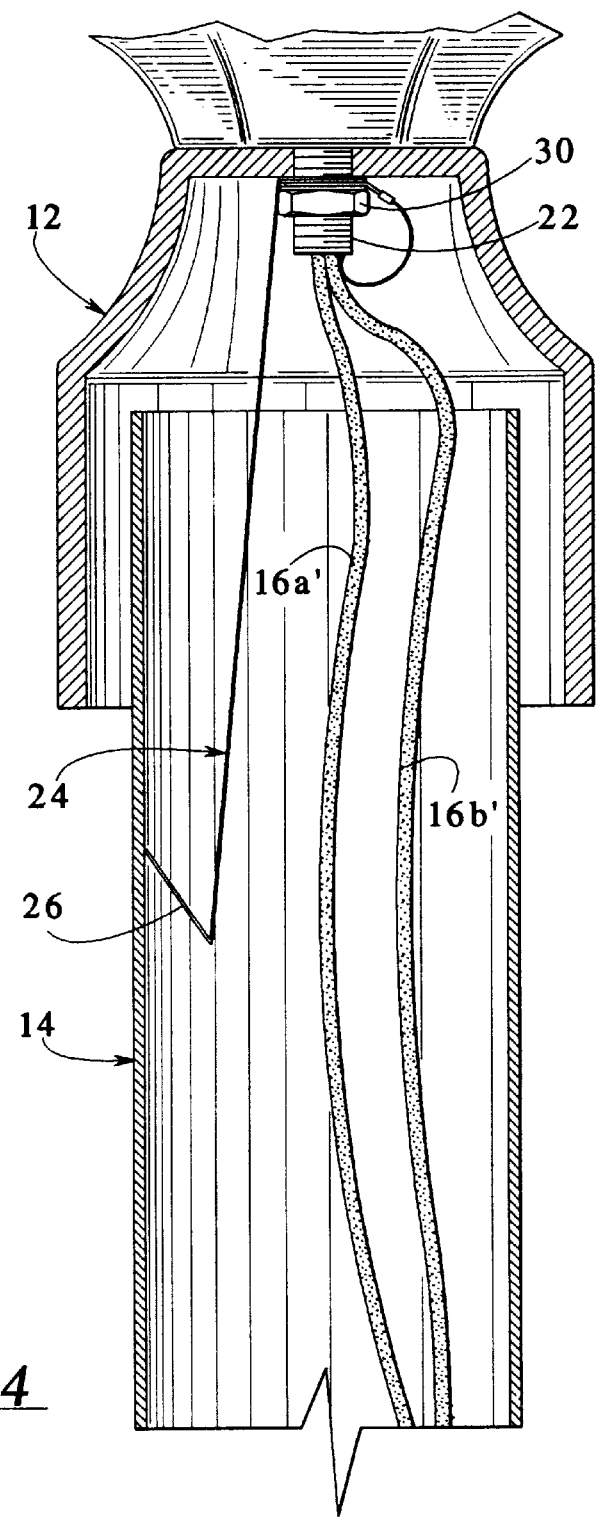
FIG. 2
FIG. 4

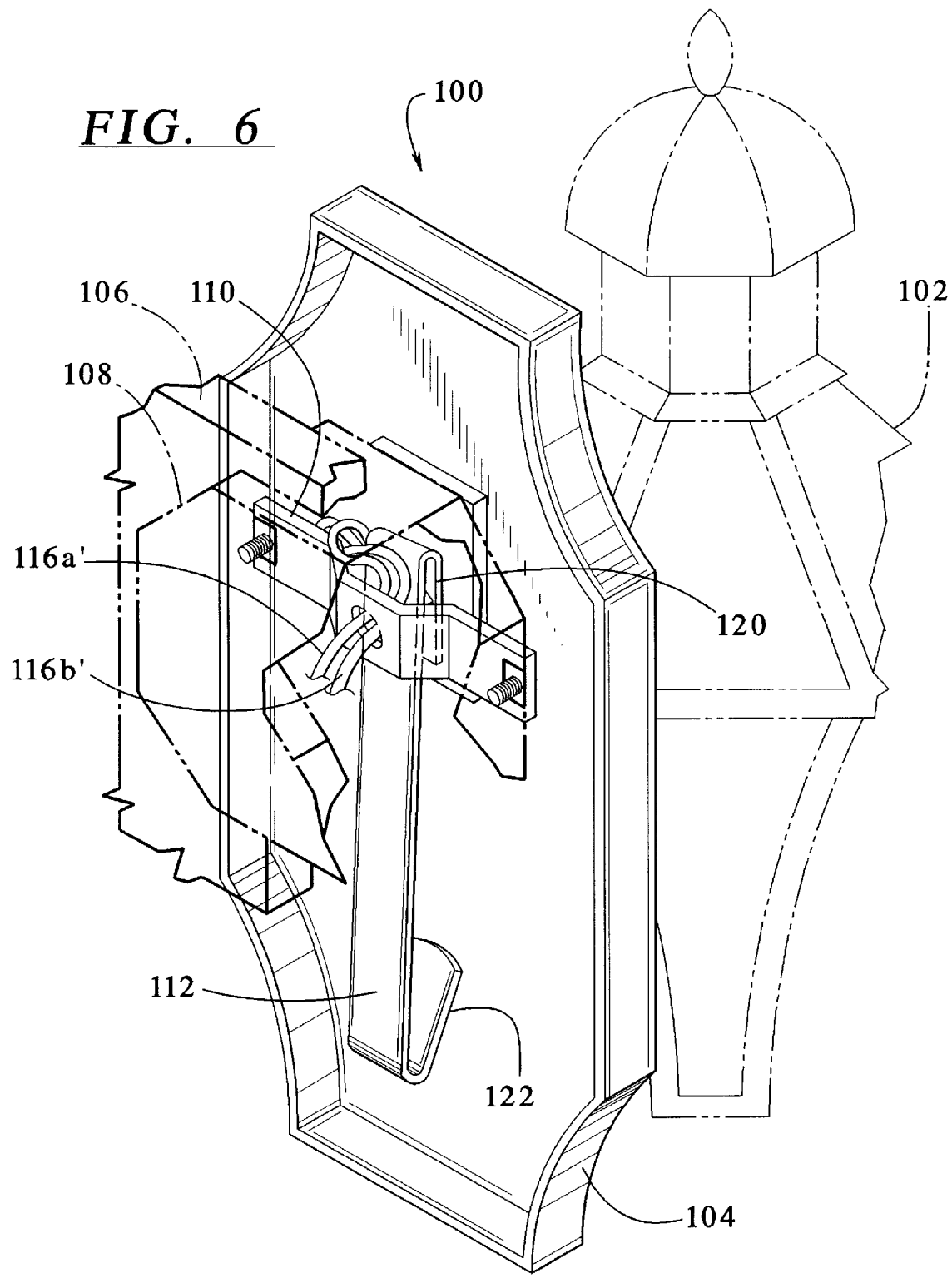

HANGING STRAP TO ASSIST IN INSTALLATION OF A FIXTURE AND A METHOD FOR ASSISTING INSTALLATION

BACKGROUND OF THE INVENTION

The present invention generally relates to a hanging or mounting strap. More specifically, the present invention relates to a hanging or mounting strap to assist in holding a lighting fixture during its installation to a mount, such as a post, a wall or the like.

It is, of course, generally known to assemble a lighting fixture to a wall, a post or the like. However, during installation, the lighting fixture requires additional installation steps, such as connection of electrical wiring. To do so, it is often cumbersome for the individual performing the installation to handle the lighting fixture and simultaneously connect the necessary electrical wiring. Typically, at least two hands are required in order to connect the wiring, and an additional hand is required to hold the fixture. Therefore, two individuals are often required in order to perform a simple installation of a lighting fixture.

Further, lighting fixtures are typically at least partially made with glass. Therefore, if the lighting fixture is not properly handled during installation thereof, an individual may shatter the glass of the lighting fixture.

A need, therefore, exists for an improved system for assisting in the installation a lighting fixture and a method for assisting installation of a lighting fixture.

SUMMARY OF THE INVENTION

The present invention generally relates to a mounting strap to assist in holding a lighting fixture near an attachment point therefor during its installation. Further, the invention relates to a system and a method for assisting in the installation of a light fixture to a mount, such as a hollow post, a wall or the like.

To this end, in an embodiment a mounting strap is provided to assist in holding a lighting fixture near an attachment point therefor during its installation. The strap has a member having a length defined between a first end and a second end wherein a portion at the first end is bent at a point along the length to form an acute angle with respect to the length of the member. An aperture is provided along the length of the member remote from the point at which the portion at the first end is bent wherein the point at which the portion is bent is attachable to the attachment point, and the first aperture is connectable to the lighting fixture.

In an embodiment, the member is constructed from a metal.

In an embodiment, the length of the member is substantially greater than its width.

In an embodiment, a second aperture is provided along the length of the member. The second aperture has a diameter smaller than a diameter of the first aperture.

In an embodiment, the member is semi-rigid.

In another embodiment of the present invention, a system is provided for assisting in installing a lighting fixture to a mount. The system has a mount defining a length between a first end and a second end wherein the first end is removably attachable to the mount and the second end is secured to the lighting fixture and further wherein the strap is capable of maintaining the lighting fixture in a fixed position during installation.

In an embodiment, a portion at the first end of the strap is bent to form an acute angle with respect to the length of the strap.

In an embodiment, the system has an aperture in the length of the strap remote from the first end.

In an embodiment, a plurality of apertures is provided along the length of the strap remote from the first end.

In an embodiment, the strap is semi-rigid and has a uniform thickness and width.

In an embodiment, the strap is bendable to place within the lighting fixture following installation.

In another embodiment of the present invention, a method is provide for assisting installation of a lighting fixture to a mount. The method comprises the steps of: providing a strap having a length defined between a first end and a second end; attaching the first end of the strap to the lighting fixture; and attaching the second end of the strap to the mount.

In an embodiment, the light fixture is in a fixed position during the installation and following attachment of the first end and the second end of the strap.

In an embodiment, the method further includes the step of bending a portion of the first end of the strap to form an acute angle between the portion and the length of the strap.

In an embodiment, the method further includes the step of providing an aperture in the strap wherein the lighting fixture is placed through the aperture.

In an embodiment, the mount is a hollow post to which the lighting fixture attaches. In an embodiment, the method further includes the step of placing the strap in the mount following installation of the lighting fixture to the mount.

In an embodiment, the method comprises the steps of removing the second end of the strap from the mount and bending the strap to enclose the strap in the lighting fixture.

It is, therefore, an advantage of the present invention to provide a mounting strap and a system and a method for assisting installation of a lighting fixture that is simple to implement.

Another advantage of the present invention is to provide a system and a method for assisting in installing a lighting fixture that is inexpensive to implement.

Yet another advantage of the present invention is to provide a system and a method for assisting installation of a lighting fixture that is adaptable to any type of mount.

A still further advantage of the present invention is to provide a system and a method for assisting installation of a lighting fixture to a mount that is adaptable to variously sized lighting fixtures.

Moreover, an advantage of the present invention is to provide a system and a method for assisting installation of a lighting fixture to a mount that requires only a single individual to perform the installation.

And, another advantage of the present invention is to provide a system and a method for assisting installation of a lighting fixture to a mount that reduces installation time.

Additional features and advantages of the present invention are described in, and will be apparent from, the detailed description of the presently preferred embodiments and from the drawings.

BRIEF DESCRIPTION OF THE DRAWINGS

FIG. 2 illustrates a cross-sectional view of an embodiment of an apparatus for hanging a lighting fixture following its installation.

FIG. 3 illustrates a plan view of an embodiment of a hanging strap of the present invention to assist installation of a lighting fixture.

FIG. 4 illustrates a side elevational view of an embodiment of a hanging strap of the present invention to assist installation of a lighting fixture.

FIG. 6 illustrates a perspective view of the embodiment illustrated in FIG. 5 following mounting of the lighting fixture.

DETAILED DESCRIPTION OF THE PRESENTLY PREFERRED EMBODIMENTS

A mounting strap is provided to assist in holding a lighting fixture near an attachment point therefor during its installation. The mounting strap assists installation for a variety of lighting fixtures to a variety of mounts. The mounts may include, for example, a post, a wall, or the like. The illustrated embodiment shows a lighting fixture attachable to a post, but the present invention should not be deemed as limited to such an environment.

Figure 1:
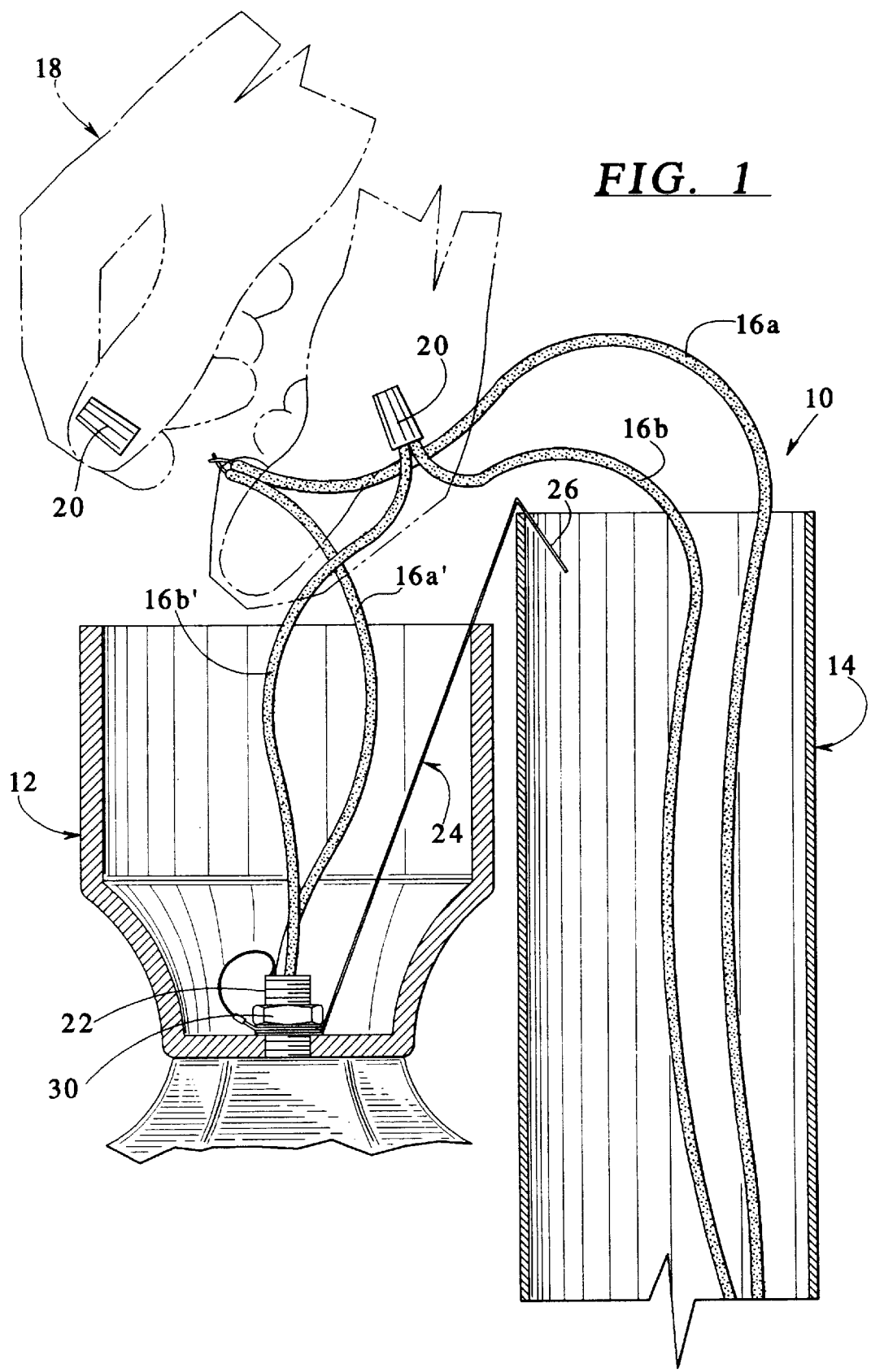
FIG. 1 illustrates a cross-sectional view of an embodiment of an apparatus for hanging a lighting fixture during its installation.

Referring now to the drawings wherein like numerals refer to like parts, FIG. 1 illustrates, in general, a lighting system 10 during its installation. To this end, a lighting fixture 12 is inverted adjacent a lighting post 14 to which the lighting fixture 12 is attached and mounted following completion of necessary steps to install a functional lighting.

As shown, electrical wiring 16a, 16b extends through the light post 14 from a source of electrical power (not shown). The electrical wiring 16a,16b requires electrical connection to the electrical wiring 16a',16b', respectively. As illustrated, hands 18 of an installer connect the electrical wiring 16a,16b extending through the lighting post 14 to the electrical wiring 16a',16b' extending from the lighting fixture 14.

Following connection, electrically insulative caps 20 may be removably attached to enclose and cover the points of electrical connection. Typically, the lighting fixture 12 includes a threaded connector 22 through which the electrical wiring 16a',16b' extends and electrically connects to, for example, a lamp, a bulb or the like. As a result, following connection of the electrical wiring, power provided to the lighting system 10 activates the lamp or bulb to provide lighting.

Figure 5:
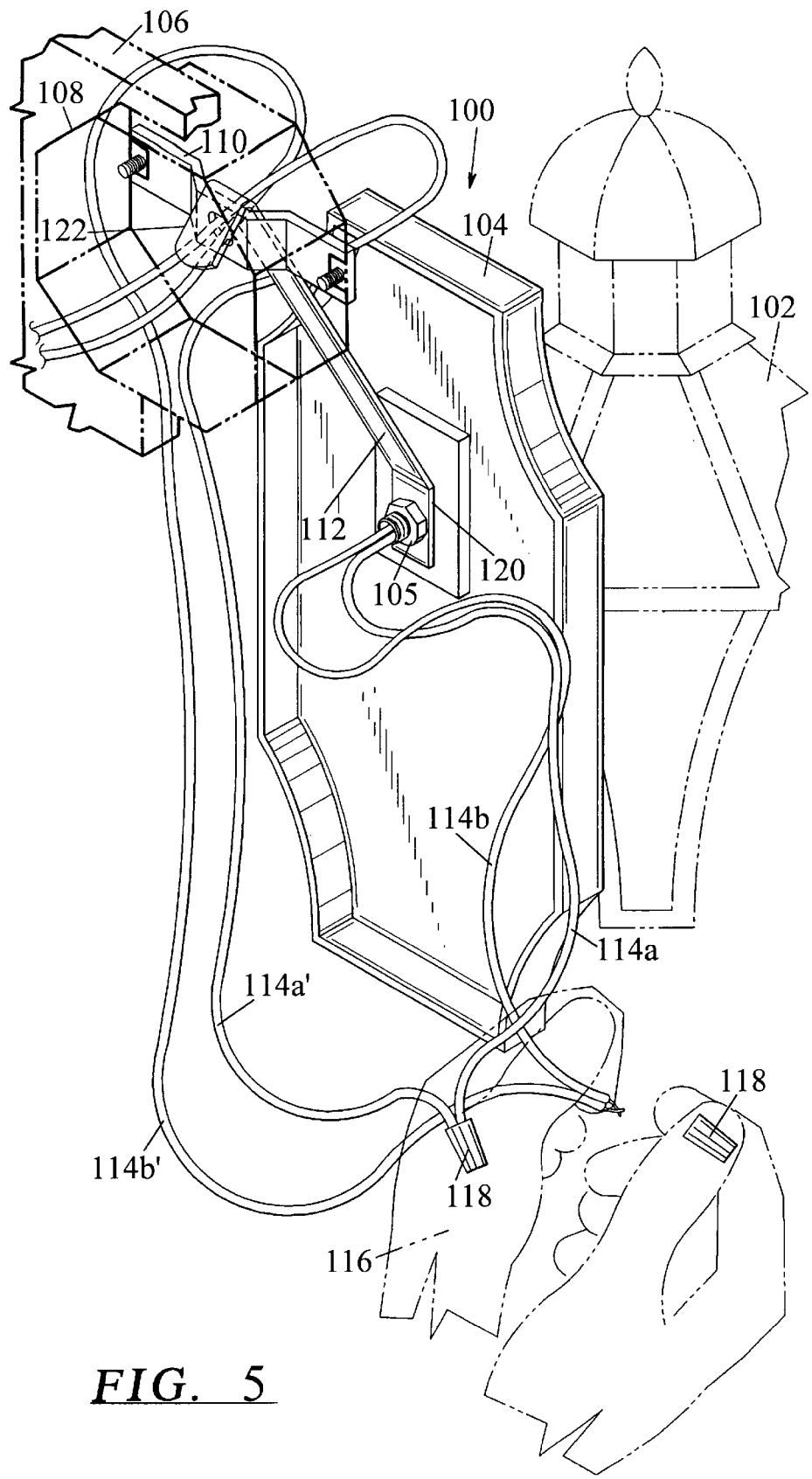
FIG. 5 illustrates a perspective view of another embodiment of a hanging strap to assist in hanging a wall-mount lighting fixture.

To assist installation of the lighting system 10, a hanging strap 24 of the present invention is provided. The hanging strap 24 is preferably constructed of steel or other semi-rigid metallic material, such as aluminum, but other materials may, of course, be used. The material from which the hanging strap 24 is constructed is critical, however, in that the material must be of sufficient ductility and/or flexibility that it can be easily bent into a desired shape. A first portion of the strap 24 requires sufficient rigidity for the strap 24 to be suspended as shown in FIGS. 1 and 5. Then, the material of the strap 24 must be implemented such that the strap 24 may be bent to fit into the lighting post 14 or placed in the position shown in FIG. 6. The hanging strap 24 will be further described with reference to FIGS. 3 and 4.

Referring now to FIGS. 3 and 4, the hanging strap 24 is generally illustrated prior to its attachment to the lighting fixture 12. To this end, the hanging strap 24 has an end 26 that forms an angle α with respect to a length of the hanging strap 24. Preferably, the angle α is less than ninety degrees (90°). In a preferred embodiment, the angle α is between ten and sixty degrees (10° and 60°). In the most preferred embodiment, the angle α is between thirty and thirty-five degrees (30° and 35°).

As shown in FIG. 3, along the length of the hanging strap 24 is a plurality of apertures designated at 28,28'. As further shown, the apertures 28,28' may be at least two different diameters. Of course, the strap 24 could be manufactured with a single aperture or manufactured so that a punch could be made in the strap 24 to form a desired diameter for the aperture 28. In addition, one or more of the apertures 28' may be used to assist in bending the strap 24 to its desired orientation to be secured around a threaded connector or other like fastener to be discussed hereinafter.

Referring again to FIG. 1, as shown, the aperture 28 may be placed around the threaded connector 22 and secured to the lighting fixture 12 by a complementary fastener, such as a nut 30, to the threaded connector 22. It should, of course, be understood that other types of connectors may be implemented by those skilled in the art.

As further illustrated, the hanging strap 24 is capable of bending along its length in order to place the aperture 28 around the threaded connector 22. As a result, prior to attempting installation of the lighting fixture 12 with the light post 14 and subsequent connection of the electrical wiring 16a,16b to the electrical wiring 16a',16b', respectively, the hanging strap 24 may be used to suspend the lighting fixture 12 from the light post 14 or other similar mounts, such as a wall or the like.

Referring now to FIG. 2, after the electrical wiring is connected, the lighting fixture 12 may be inverted and placed over the post 14 to complete installation of the lighting fixture 12 on the light post 14. As shown, the hanging strap 24 is designed such that it may remain attached to the lighting fixture 12 at the connector 22 and fed into the post 14. Preferably, the end 26 of the hanging strap 24 has a radiused end 32 as shown in FIG. 3 to simplify insertion of the hanging strap 24 into the post 14 without significantly bending the strap 24.

As can be appreciated from the foregoing, the hanging strap 24 may be implemented by those skilled in the art to any lighting fixture—large or small, indoor or outdoor. Further, any type of mount that allows the hanging strap 24 to suspend therefrom may be implemented. As a result, the lighting fixture 10 may be installed by a single individual without danger of dropping the fixture 10. Further, the installation time and labor costs involved in installation of the lighting fixture 10 are both reduced.

Referring now to FIGS. 5 and 6, another use and embodiment of a lighting system 100 is shown. As illustrated, the lighting system 100 is a traditional wall mounting type of system having a lighting fixture 102 attached to a mounting plate 104. The lighting fixture 102 may be removably attached to the mounting plate 104. The mounting plate 104 is subsequently attachable to a wall 106 in a conventional manner. To this end, an electrical box 108, also conventional, is provided. A bracket 110 is provided and secured to the electrical box 108 from which the hanging strap 112 of the present invention may be suspended during installation and connection of electrical wiring 114a,114b to electrical wiring 114a',114b', respectively. As illustrated, hands 116 of an installer connect the electrical wiring 114a,114b extending from the lighting fixture 102 to the electrical wiring 114a',114b' extending from the electrical box 108 attached to the wall 106.

Following connection, electrically insulative caps 118 may be removably attached to enclose and cover the points of electrical connection. As a result, following connection of the electrical wiring, power is provided to the lighting system 100 in order to activate a lamp or bulb to provide light emanating from the lighting fixture 102.

To assist installation of the lighting system 100, the hanging strap 112 of the present invention is provided. The hanging strap 112 is preferably constructed of steel or other semi-rigid, bendable, metallic material, such as aluminum, but other materials may, of course, be implemented by those skilled in the art. As previously explained, the material from which the hanging strap 112 is constructed must be of sufficient flexibility to bend to the position shown in FIG. 6 and must be of sufficient rigidity to suspend the fixture as shown in FIG. 5.

The hanging strap 112, as shown in the embodiment of the lighting system 100, is provided as an attachment to a rear side of the mounting plate 104. An aperture (not shown) at one end of the hanging strap 112 allows the electrical wiring 116a', 116b' to extend therethrough and further provides for selective securement of the hanging strap 112 to the mounting plate 104. The hanging strap 112 includes two angular bends at each end 120 and 122 of the hanging strap 112. The angular orientation at the end 122 allows the strap to be suspended from the bracket 110 of the electrical box 108. Likewise, the angular bend in the strap 112 at the end 120 allows for the strap 112 to be mounted flush against a rear side of the mounting plate 104. As illustrated in FIG. 5, the strap 112 is attached to the rear side of the mounting plate 104 with a nut 105 removably securing the strap 112. Of course, it should be understood that the strap 112 could be permanently welded to the mounting plate 104, integrally formed with the mounting plate 104, or the like.

Referring now to FIG. 6, after the electrical wiring is connected, the hanging strap 112 may be removed from the bracket 110 of the electrical box 108. The hanging strap 112 is compressed to extend substantially parallel to a backside of a mounting plate 104 as clearly shown in FIG. 6. As a result, should the lighting system 100 require maintenance, the mounting plate 104 is removed from the wall 106 and the hanging strap 112 may be re-adjusted to the position illustrated in FIG. 5 such that the lighting fixture 102 may be suspended from the bracket 110 allowing maintenance or the like to be conducted by an individual using both hands. Typically, a single hand is used since one hand is required to hold the lighting fixture 102 during maintenance or the like.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A mounting strap to assist in holding a lighting fixture near an attachment point therefor during its installation, the strap comprising:

a member having a length defined between a first end and a second end wherein a portion at the first end is bent at an angular point along the length to form an acute angle with respect to the length of the member;

a first aperture along the length of the member remote from the angular point at which the portion at the first end is bent wherein the angular point is attachable to the attachment point and the first aperture is connectable to the lighting fixture wherein the member is bent at a point between the angular point and the aperture forming an obtuse angle with respect to the length of the member wherein the member is linear except for the bent angular point and the bent point forming an obtuse angle.

2. The strap of claim 1 wherein the member is constructed from a metal.

3. The strap of claim 1 wherein the length of the member is substantially greater than its width.

4. The strap of claim 1 further comprising:

a second aperture along the length of the member.

5. The strap of claim 4 wherein the second aperture has a diameter smaller than a diameter of the first aperture.

6. The strap of claim 1 wherein the first end is radiused.

7. The strap of claim 1 wherein the member is semi-rigid.

8. A system for assisting in installing a lighting fixture to a mount, the system comprising:

a strap for attachment to the lighting fixture defining a length between a first end and a second end wherein the first end is provided for removable attachment to the mount and the second end is provided for securing to the lighting fixture and further wherein the strap is capable of maintaining the lighting fixture in a fixed position during installation wherein the strap is linear except for a first bend and a second bend wherein the first bend forms an acute angle and the second bend forms the obtuse angle.

9. The system of claim 8 wherein a portion at the first end of the strap is bent to form an acute angle with respect to the length of the strap.

10. The system of claim 8 further comprising:

an aperture in the length of the strap remote from the first end.

11. The system of claim 8 further comprising:

a plurality of apertures along the length of the strap remote from the first end.

12. The system of claim 8 wherein the strap is constructed from a metal.

13. The system of claim 8 wherein the strap is semi-rigid and has a uniform thickness and width.

14. The system of claim 8 wherein the strap is bendable.

15. A method for assisting installation of a lighting fixture to a mount, the method comprising the steps of:

providing a strap having a length defined between a first end and a second end;

securing the first end of the strap for attachment to the mount;

attaching the second end of the strap to the light fixture;

bending a portion of the first end of the strap to form an acute angle between the portion and the length of the strap; and bending a portion of the second end of the strap to form an obtuse angle wherein the strap is linear except for the bent end portions.

16. The method of claim 15 further comprising the step of:

providing an aperture in the strap for placing the lighting fixture through the aperture.

17. The method of claim 15 wherein the mount is a hollow post for attachment of the lighting fixture.

18. The method of claim 15 further comprising the step of:

placing the strap in the mount.

19. The method of claim 15 wherein the mount is a wall.

20. The method of claim 15 further comprising the steps of:

removing the second end of the strap from the mount; and bending the strap for enclosing the strap in the lighting fixture.

* * * * *